United States Patent [19]
Greco

[11] Patent Number: 5,847,069
[45] Date of Patent: Dec. 8, 1998

[54] PROCESS FOR THE PREPARATION OF POLYCARBONATE COPOLYETHER POLYOLS

[75] Inventor: Alberto Greco, Milan, Italy

[73] Assignee: Enichem S.p.A., Milan, Italy

[21] Appl. No.: 818,899

[22] Filed: Mar. 17, 1997

[30] Foreign Application Priority Data

Mar. 28, 1996 [IT] Italy .............................. MI96 A 000614

[51] Int. Cl.[6] ..................................................... C08G 64/00
[52] U.S. Cl. ............................................. 528/196; 528/198
[58] Field of Search ...................................... 528/196, 198

[56] References Cited

U.S. PATENT DOCUMENTS

| | | | |
|---|---|---|---|
| 4,518,766 | 5/1985 | Greco et al. | 528/370 |
| 4,990,578 | 2/1991 | Greco et al. | 523/456 |
| 5,116,929 | 5/1992 | Greco et al. | 528/44 |
| 5,288,839 | 2/1994 | Greco | 528/204 |

*Primary Examiner*—Terressa Mosley
*Attorney, Agent, or Firm*—Oblon, Spivak, McClelland, Maier & Neustadt, P.C.

[57] ABSTRACT

A process is described for the preparation of polycarbonate polyether polyols characterized in that dimethylcarbonate (DMC) and one or more polyether diols are reacted at a ratio DMC/polyether diols of between 0.5 and 1.35, at a temperature of between 130° and 175° C. and in the presence of a catalyst consisting of an oxide, a carbonate or an alcoholate of a metal of the first or second group or a salt or organometallic compound of a metal belonging to the third or fourth or fifth group at a concentration of between 0.0001 and 0.01%.

14 Claims, No Drawings

PROCESS FOR THE PREPARATION OF POLYCARBONATE COPOLYETHER POLYOLS

The present invention relates to a process for the preparation of polycarbonate copolyether polyols.

More specifically, it relates to a process for the preparation of polycarbonate copolyether diols (PEG CD), triols and polyols (PEG CP) which involves the transesterification of dimethyl carbonate (DMC) with polyether glycols or polyols (PEG) in the presence of a suitable catalyst.

The invention also relates to the polycarbonate polyether diols, triols and polyols obtained by the above process.

Polycarbonate polyether diols, triols and polyols can be usefully applied as additives in the field of polyurethane end-products, thermoelastomers, paints and adhesives.

A variety of syntheses for the preparation of PEG CD are known in the art.

One method, for example, comprises the condensation of PEG with phosgene in the presence of substances capable of subtracting hydrochloric acid.

This synthetic method however, involves a chemical reagent, phosgene, which can only be synthesized and used in appropriate industrial areas and, in addition, produces vast quantities of inorganic waste products (NaCl, $CaCl_2$) in the form of aqueous solutions, which must be disposed of.

Another method enables PEG CD to be obtained by the addition of carbon dioxide to cyclic ethers, such as ethylene and propylene oxide, in the presence of glycol as polymerization initiator (EP 220453; R. H. Harris, J. Appl. Polym. Sc. 44, 605 (1992); J. Appl. Polym. Sc. 41,1907, (1990); WO 8700185; U.S. Pat. No. 4,816,529; U.S. Pat. No. 4,295,810).

This synthesis method, although having the advantage of using low cost raw materials, does not allow the direct preparation of PEG CD with a low molecular weight and provides only structures deriving from polyethylene and polypropyleneglycol. In addition, it requires large quantities of catalyst whose elimination from high viscosity products considerably complicates the process, as disclosed for example in U.S. Pat No. 4.528.364. This however is a necessary step for perfecting the second phase of the reaction which enables the molecular weight of the PEG CD to be controlled. In the second step, temperatures of between 180° and 210° are used to perfect the extraction of the lighter polyether glycol from the reaction medium by distillation under vacuum and, in this temperature range, polyether polycarbonates, particularly in the presence of catalysts, are not thermally stable.

The thermal decomposition induced by the high temperatures tends to increase the level of unsaturation present in the product, it makes it difficult to minimize the colour and causes the formation of by-products.

Another method for obtaining PEG CD is to react in the presence of suitable catalysts, among which, for example, the sodium stannate mentioned above, cyclic carbonates of ethylene glycols or polypropyleneglycols with smaller proportions of glycol used as polymerization initiator (Polymer 33, 13, 2807, 1992; U.S. Pat No. 4,105,641).

This system however has the same limitations as the previous process and also requires the availability of ethylene and/or propylene carbonate, generally obtained by the addition of carbon dioxide to the corresponding epoxides.

A further way of producing PEG CD is the transesterification of PEG with dialkyl, diaryl, diallyl or alkylene carbonates.

The transesterification process has some advantages with respect to the previous method; in particular it enables the synthesis of all possible structures, the use of limited quantities of catalyst and the programming of the molecular weight (Mn) on the basis of the stoichiometric value of PEG/dialkyl, diaryl, dialkylcarbonate or alkylene carbonate. Reagents however, such as diethylcarbonate (DEC) and ethylene carbonate (EC), which seem particularly appropriate for this type of reaction, are extremely costly (U.S. Pat No. 4,476,273) and do not guarantee molecular weights with sufficient accuracy over the limit of 1500 units on the sole basis of the stoichiometric value, and in addition the industrial production of DEC requires the use of phosgene. The use of DEC and EC therefore necessitates, for controlling the MW, the extraction of the glycol by distillation under vacuum as mentioned above.

We have now found a process for the preparation of polycarbonate copolyether polyols and in particular diols (PEG CD) and triols (PEG CP) based on the transesterification of dimethyl carbonate (DMC) with polyether glycols or polyols (PEG) in the presence of a suitable catalyst, which overcomes the disadvantages of the known art.

More specifically, the present invention relates to a process for the preparation of polycarbonate copolyether polyols having the formula:

$$R\left[\left(OCOR_1\right)_x\left(OCOR_2\right)_y\ldots\left(OCOR_n\right)_z OH\right]_n \quad (I)$$

wherein R is an organic radical with a valence n varying from 2 to 6, selected from the following structures:

$$-(CH_2-CH_2O)_{x'}-CH_2-CH_2-$$

wherein x' varies from 0 to 4

$$-(CH_2-CH_2-CH_2-CH_2O)_{y'}-CH_2-CH_2-CH_2-CH_2-$$

wherein y' varies from 1 to 10

$$-(CH_2-CH_2-CH_2-CH_2O)_{y''}-CH_2-CH_2O)_{x'}-CH_2-CH_2-$$

wherein y'' varies from 1 to 5

$$-(CH_2-\underset{\underset{CH_3}{|}}{CH}-O)_{w'}-CH_2-\underset{\underset{CH_3}{|}}{CH}-$$

wherein w' varies from 1 to 10

$$-(CH_2-CH_2O)_{x''}-(CH_2-\underset{\underset{CH_3}{|}}{CH}-O)_{z'}-CH_2-CH_2-$$

wherein z' varies from 1 to 3 and x'' from 2 to 5

$$\begin{array}{c}CH_2- \\ | \\ CH- \\ | \\ CH_2-\end{array}\begin{array}{c}CH_2 \\ | \\ CH-(O-CH\overset{CH_3(H)}{\underset{|}{\rule{0pt}{1ex}}}CH)_{w'};\end{array} CH_3-\begin{array}{c}CH_2- \\ | \\ C-CH_2- \\ | \\ CH_2-\end{array}$$

wherein w' varies from 1 to 10

$R_1, R_2 \ldots R_n$ in formula (I), the same or different are divalent organic radicals in the group of those listed for R; x, y . . . z, represent the number of sequences, statistically distributed, of oligopolyether carbonates deriving from glycols whose organic radical corresponds to $R_1, R_2 \ldots R_n$ respectively, and are such that, either singly or as a sum, they can assume any average value, also fractional, within the range of 2 and 30;

x, y, . . . z have the value previously indicated and R can be indifferently identical to $R_1$ or $R_2$ or $R_n$;

this process being characterized in that the dimethylcarbonate (DMC) is reacted with one or more polyether diols whose organic radicals R, $R_1$, $R_2$ . . . $R_n$ have been previously defined and with one or more polyether diols with a molecular weight of between 100 and 200, at a ratio DMC/polyether diols of between 0.5 and 1.35, at a temperature of between 130° and 175° C., in the presence of a catalyst consisting of an oxide, a carbonate or an alcoholate of a metal of the first or second group or a salt or an organometallic compound belonging to the third or fourth or fifth group with a concentration of between 0.0001 and 0.01% by weight.

The process as defined above provides the following advantages:
- accessibility to PEG CD of the most varied structures;
- accurate control of the MW (Mn);
- process conditions capable of guaranteeing high quality PEG CD (low colouring, hydroxyl functionality close to the theoretical value);
- use of very low levels of catalyst to make the elimination of the catalyst in the PEG CP simpler or superfluous;
- process conditions which minimize the formation of by-products.

The products obtained with the process of the present invention can be usefully applied as additives in the field of polyurethanes where they are capable of giving the end-products better rigidity, better resistance to solvents and higher thermal resistance with respect to conventional polyethers such as for example PT MEG, polypropyleneglycol or propyleneglycol b polyethyleneglycol.

The PEG CP with structure I can be obtained with a transesterification process in which the following products are interacted:
- dimethyl carbonate (DMC)
- one or more polyether diols whose organic radicals R, $R_1$, $R_2$ . . . $R_n$ have been previously specified; at least one of the above radicals can derive from an oligopolyether diol (PEG) with a molecular weight of between 106 and 200 and participates in structure I in a proportion of not less than 10% by weight of the sum of the organic radicals of polyether glycols with a molecular weight of more than 200 units;
- a transesterification catalyst whose concentration varies from 0.0001 to 0.01% by weight, consisting of an oxide, a hydroxide, carbonate or alcoholate of a metal of the first or second group or a salt or an organometallic compound of a metal belonging to the third or fourth or fifth group.

When polyether diols in which R is a divalent organic radical are reacted, products having formula (Ia) are obtained:

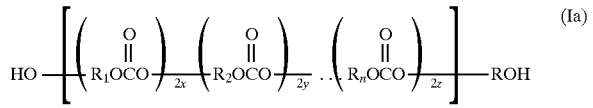

wherein $R_1$, $R_2$ . . . $R_n$, have the value indicated above and are present in the structure up to a proportion, individually or as a sum, of not less than 10% by weight with respect to the organic radicals deriving from other glycols.

The polyetherpolyol(s) with a MW of between 100 and 200 represent a proportion of organic radicals in structure I of not less than 10% by weight of the sum of the organic radicals of polyetherglycols with a different structure.

These distillable glycols are preferably selected from diethyleneglycol and dipropyleneglycol.

The transesterification reaction is carried out under the following conditions:
- DMC and polyetherglycols deriving from organic radicals $R_1,R_2$ . . . $R_n$ are reacted at a ratio DMC/R of between 0.5 and 1.35.
- the reaction is carried out under efficient rectification conditions between 130° and 185° C. and preferably between 160° and 175° C.
- the molecular weight of the polyether glycols, within the range of 500 and 5000, is controlled by means of extraction by distillation of the polyetherglycol with a MW of between 100 and 200, by applying a vacuum <5 mm Hg.
- the process is preferably carried out in three phases: the first with a duration of from 6 to 24 hours is carried out at atmospheric pressure, the second with a duration of from 2 to 8 hours is carried out with a reduced pressure of between 150 and 760 mm of Hg and finally the third phase with a duration of between 2 and 10 hours, in a total operating cycle varying from 8 to 48 hours, is carried out under vacuum <5 mm Hg and enables extraction by distillation of the polyetherglycol at a lower boiling point in order to reach the correct molecular weight of the PEG CP.

As catalyst, LiOH, $LiCO_3$, $K_2CO_3$, KOH, NaOH, NaOMe, MeO—Mg—$OCOOCH_3$, CaO, BaO, KOtbut can be used or compounds of titanium, zirconium, lead, tin and antimonium; in particular $TiCl_4$, titanium tetraalcoholates or tetraphenates, zirconium tetraalcoholates, stannous octoate, dibutyltin dilaurate, dibutyltin methoxide, tin oxalate, lead stearate, antimonium trioxide.

Titanium alcoholates are preferred, such as titanium tetraisopropoxide or tetrabutoxide preferably to be used at concentrations of between 0.0005 and 0.003% as $Ti^{4+}$ ion or CaO at concentrations of between 0.0001 and 0.0005% expressed as $Ca^{2+}$ ion.

The divalent organic radicals $R_1$, $R_2$ . . . $R_n$ are the skeleton left in the PEG CP by respectively polyethylene glycols such as, for example, diethyleneglycol (DEG), triethyleneglycol (TEG), tetraethyleneglycol (4 EG) and polyethyleneglycols such as, for example, polyethyleneglycol with Mn 200 (PEG 200), polypropyleneglycols such as, for example, dipropyleneglycol (DPG), tripropyleneglycol (TPG), polypropyleneglycol with Mn 400 (PPG 400), polypropyleneglycol Mn 650 (PPG 650), polytetramethyleneglycol such as, for example, PTMEG with Mn 250 (PTMEG 250), PTMEG with Mn 600 (PTMEG 600), ethoxylate glycol, such as tri or tetraethoxylate DPG or TPG or tri or tetraethoxylate butandiol; DEG and DPG are preferably used.

Another condition in formula I is that at least one of the divalent organic radicals $R_1$, $R_2$ . . . $R_n$ derives from an oligopolyether diol (PEG) with a low molecular weight, i.e. which is such as to be able to be distilled under the process conditions.

For this purpose the MW of the glycol or glycols whose radical is within structure I, must be between 106 and 200. The following polyethylene glycols have these characteristics: diethyleneglycol (DEG), triethyleneglycol (TEG), dipropyleneglycol (DPG) and tripropyleneglycol (TPG).

In the specific case of polycarbonate copolyether diols (PEG CD, $I_a$) there is the restriction that organic radicals $R_1$, $R_2$ . . . $R_n$, deriving from one or more polyethyleneoxideglycols must be always present in the structure up to a proportion, individually or as a sum, of not less than 10% by weight with respect to the other polyetherglycols.

EXAMPLE 1

Preparation of PEG CD ($I^1_A$).

2200 g (20.75 moles) of fresh distillated diethyleneglycol are charged into a 3 1 four-necked flask with an overlying rectification column of 1 m×2.5 cm in diameter with a packing of Fensche rings, equipped with a thermometer and charging funnel.

The contents of the flask are brought to 155/160° C. by means of an external oil-bath and 250 g of DMC are introduced through the drip funnel; the mixture is brought to total reflux until the temperature at the head of the column remains stable at 82°–86° C.; 4 ml of catalyst consisting of a saturated aqueous solution of CaO ($Ca^{2+}$ content in water, 938 ppm, 3.75 mg of total $Ca^{2+}$) are added with a syringe by means of a serum cap applied to one of the necks of the flask. The total reflux is maintained until the temperature in the centre and head of the column are stable at 66° and 63° respectively.

Samples of the DMC methanol azeotropic mixture are then extracted at a rate of 120–180 ml/hour.

The remaining DMC (g 2100) is fed during the test at such a rate that the temperature of the boiler never falls below 155° C. (8–10 hours). In about 10–12 hours 154 g of DMC-methanol azeotrope are collected at atmospheric pressure.

A vacuum is applied bringing the pressure from 760 to 150 mm Hg in four hours, during which a further fraction of the Methanol DMC azeotropic mixture (g 220) is collected. The vacuum is then gradually applied up to a residual pressure of 1 mm Hg and the temperature of the boiler is progressively increased to 170°–173° C. After 4 hours at maximum vacuum 90 g of DMC-methanol mixture are collected in the traps which protect the pump, cooled to –78° C., together with 150 g of a heavy distillate mostly consisting of diethyleneglycol (>95%), at the head of the column.

The polyol in the boiler (2530 g) has $N°_{OH}$ 56.2, colour (APHA) 20/30 and the following structure:

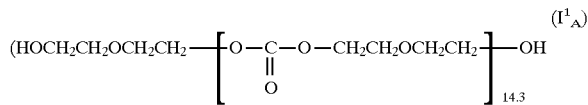

EXAMPLE 2

Preparation of PEG CD ($I^2_A$).

Polyethyleneglycol ($N°_{OH}$ 569.5, Mn 197, g 1500, moles 7.61) and DEG (g 700, moles 660) without alkalinity, are placed under a nitrogen atmosphere in a 3 litre four-necked flask equipped with a thermometer, drip-funnel, nitrogen inlet and with a magnetic stirrer. The flask, whose heating is effected by means of an oil-bath, has an overlying rectification column of one metre in height and 2.5 cm in diameter packed with Fensche rings, equipped with a head having a water cooling system to control the reflux ratio from 1:1 to 1:50.

The mixture of glycols is heated with the oil-bath to 160° C. and DMC (g 300) is fed from the drip-funnel in a sufficient quantity to maintain an efficient reflux at a temperature of 150°–160° C. A fraction (30 g) and b.p. 76°–88°

C., consisting of DMC-$H_2O$ is removed from the head of the column at a high reflux ratio. When the first DMC (mp 87°–89° C. at atmospheric pressure) passes to the head of the column, titanium tetraisopropylate (g 0.22; mmoles 0.775; 0.01 weight %) is charged into the flask, in the form of a solution in isopropanol (20% by weight of TIPA in IPA) bringing the column to total reflux. At the head of the column, the temperature recorded initially of 87°–89° C., drops, after about an hour, to 62°–63° C. (boiling point of the DMC-MeOH azeotropic mixture at atmospheric pressure).

The temperature of the boiler is maintained between 155° and 165° C and the removal of the methanol-DMC azeotrope from the head of the column is started, whereas the remaining DMC (g 1500; total g 1800 comprising the initial aliquot, moles 20) is fed into the flask at the same collecting rate.

At the end of the feeding, the temperature inside the reactor is brought to 168°–170° C. This phase carried out at atmospheric pressure has a total duration of 12–16 hours and enables practically pure DMC-methanol azeotrope to be collected (g 1080).

With the temperature of the reactor maintained at 168°–170° C. and with a high reflux ratio at the head of the column, a vacuum is gradually applied (in 2–4 hours), with half the vacuum pump protected by a trap cooled with dry ice, until there is a residual pressure of 150 mm Hg. At the end of this phase, a further aliquot of methanol-DMC azeotropic mixture is collected with a b.p. varying from 62°–63° C. to 30° C.

At this point the column is disconnected from the reactor and is substituted with a Liebig cooler connected to a collection flask; the reactor is again subjected to vacuum by gradually lowering the pressure from 150 to 1 mm Hg with the help of the vacuum pump at a reduction rate of the vacuum of about 30–35 mm Hg/hour, the temperature inside the reactor being maintained at 168°–170° C. In about 6 hours at a residual pressure of between 10 mm Hg and 1 mm Hg a fraction of heavy distillate mainly consisting of DEG (>8% by weight of the distillate fraction: g 97) is collected by means of the cooler. Another fraction is collected in the trap (g 26); this fraction represents the incondensable product and mainly consists of methanol and DMC with a smaller proportion of dioxane (g 0.52, 2% by weight).

The PCG CD thus produced ($I^2_A$, g 2300) is represented by the following structural formula $I^2_A$ with $N°_{OH}$ and Mn corresponding to 1960

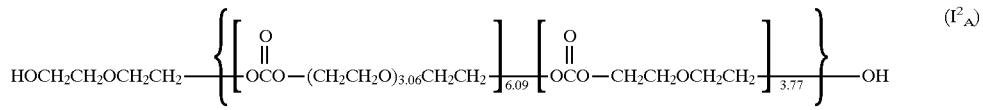

The other characteristics of ($I^2_A$) are shown in table 1.

EXAMPLES 3–8

These examples describe the preparation of PCG co ET diols with $I_A$ having a different structure; the reactor and operating procedure are those described in example 1.

The following table shows the data relating to the balance of materials of the single tests.

| Example nr. | 3 ($I_A^3$) | 4 ($I_A^4$) | 5 ($I_A^5$) | 6 ($I_A^6$) | 7 ($I_A^7$) | 8* ($I_A^8$) |
|---|---|---|---|---|---|---|
| DMC (g) | 2130 | 2200 | 308 | 1500 | 1800 | 310 |
| glycol | DEG | DFG | PTM EG | TPG | DEG | DPG b Eo |
| (g) | 1908 | 2000 | 600 | 1600 | 200 | 600 |
| glycol | — | — | DEG | DEG | TEG | DEG |
| (g) | | | 80 | 700 | 1800 | 80 |
| catalyst | TIPA | TIPA | TIPA | NaMEt | TIPA | TIPA |
| (g) | 0.15 | 0.25 | 0.15 | 0.1 | 0.15 | 0.08 |
| atm. press. distil. (g) | 1425 | 1409 | N.D. | 1100 | 1230 | N.D. |
| reduced pressure distil. (g) | 155 | 146 | N.D. | 108 | 114 | N.D. |
| incondens. losses (g) | 163 | 95 | 12 | 171 | 160 | 16 |
| heavy distil. (g) | 127 | 139 | 20 | 140 | 122 | 23 |
| yield (g) | 2200 | N.D. | 710 | 2400 | 2308 | 703 |

(*) DPG b EO was obtained by adding 3 moles of ethylene oxide to diisopropyleneglycol (DPG) and is represented by the mixture of glycols with an average polymerization degree (Mn) 260, normally represented by the formula:

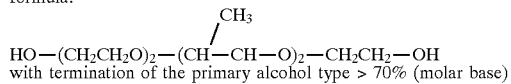

with termination of the primary alcohol type > 70% (molar base)

The PEG CD of examples 3 to 8, structures from $I^3_A$ to $I^8_A$ are represented by the following structures:

Ex. Nr. 3 ($I^3_A$) (Mn 2260)

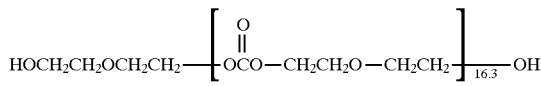

Ex. Nr. 4($I^4_A$)(Mn2017)

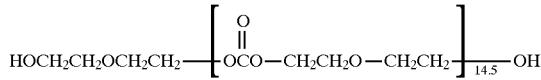

Ex. Nr. 5($I^5_A$)(Mn1780)

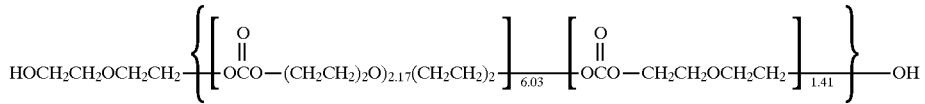

Ex. Nr. 6($I^6_A$)(Mn2051)

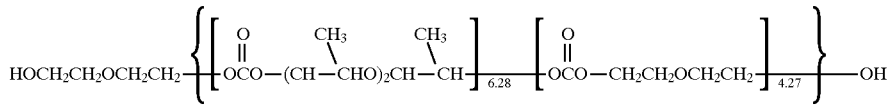

Ex. Nr. 7($I^7_A$)(Mn1925)

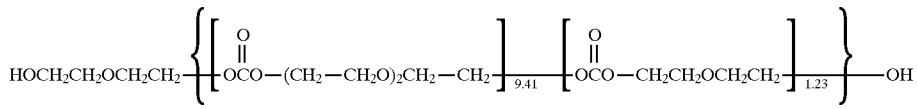

Ex. Nr. 8($I^8_A$)(Mn1835)

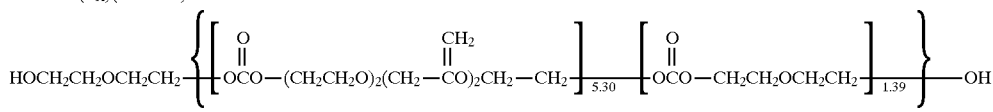

The characteristics of the PEG CD of examples 2 to 8 are shown in table 1.

EXAMPLE 9

Preparation of polyether polycarbonate triol PEG CP

A mixture of dipropyleneglycol (DPG), tripropyleneglycol (TPG) and tetrapropyleneglycol (4PG) in the relative proportion DPG/TPG/4PG 22/50/28 (g 1057, $N°_{OH}$ 557.36, Mn 201 moles 5.258), polypropyleneglycol (g 600, $N°_{OH}$ 235.28, Mn 477, moles 1.258), propoxylateglycerol (g 182, $N°_{OH}$ 591.02, Mn 284, moles 0.641), triphenylphosphite (g 0.1) and NaMet (0.3 ml, 30% solution in $CH_3OH$), are charged, without residual alkalinity, into the same reactor described in example 1.

The internal temperature is brought to 150°–160° C. and DMC (g 776, moles 8.62) is fed from the drip-funnel within a period of 8–10 hours.

Similarly to what is illustrated in example 1, three fractions are collected, the first which is distilled under rectification conditions at atmospheric pressure, consists of the azeotropic mixture MeOH-DMC, the second, also consisting of the azeotropic mixture MeOH-DMC, is collected at a pressure progressively reduced from 760 to 150 mm Hg and, finally, the heavy distillate is collected between 160° and 185° C. at a residual pressure varying from 10 to 1 mm Hg. This mostly (>90%) consists of a mixture of DPG and TPG (50:50) and amounts to g 160.

The total duration of the test is 20 hours (12 hours for the distillation cycle with rectification at atmospheric pressure, 3 hours for the distillation cycle at reduced pressure and finally 4–5 hours for the collection of the heavy distillate.

The yield of $I^1_B$ amounts of 1410 g; the product has $N°_{OH}$ 49.17 corresponding to Mn 3423 for a hydroxylic functionality of 3. ($I^1_B$) is represented by the formula:

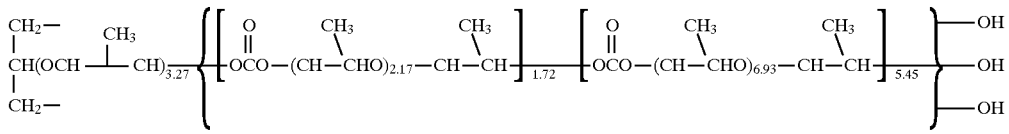

The characteristics of $I^1_B$ are shown in table 1.

EXAMPLES 10–11

These examples illustrate the preparation and characteristics of PEG CP.(triols) with a different ($I^2$) and ($I^3$) structure.

The balance of the synthesis materials is illustrated in the following table:

| Ex. Nr. | 10 | 11 |
|---|---|---|
| DMC (g) | 950 | 610 |
| glycol | TPG | TPG |
| (g) | 1920 | 532 |
| glycol | tripropoxyl. glycer. | polypropylenglycol |
| (g) | N°$_{OH}$ 596.8, Mn 282 | N°$_{OH}$ 235.2, Mn 477 |
|  | 182 | 1120 |
| glycol | — | tripropoxyl. glycer. |
| (g) |  | N°$_{OH}$ 596.8, Mn 282 |
|  |  | 182 |
| catalyst. | Kot But. | Kot But. |
| (g) | 0.020 | 0.020 |
| heavy dist (g) | 138 | 164 |
| yield (g) | 2200 | 1850 |

The following structures correspond to examples 10 and 11:

Ex. Nr. 10 ($I^2$) (Mn 3270)

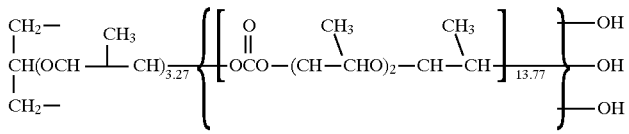

Ex. Nr. 11 ($I^3$) (Mn 3500)

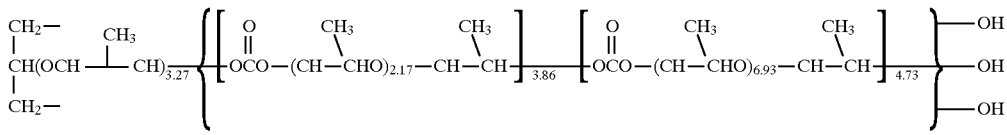

The characteristics of the PEG CP are shown in table 1.

EXAMPLES 12–19

Examples 18 and 19 represent controls. Thermoelastomers (TPU) were prepared starting from the PEG CD of table 1, corresponding to examples 1, 2, 3, 5, 6 and 8.

The TPU were prepared in dimethylformamide, at 35% by weight of solids, by reacting PCG Co Et, butane 1,4 diol (BD) and diphenyl methane diisocyanate (MDI) with each other at a ratio –NCO/OH=1.03, the ratio between the three reagents was such as to ensure a proportion of —NHCOO— groups of 15% by weight in the thermoelastomer.

During the reaction tin dibutyl dilaureate is added (10 ppm on the solids) to accelerate the addition reaction of NCO-hydroxyl.

The TPU are recovered after further dilution with DMF (20% of solids) in the form of film with a thickness of 0.25–0.35 mm by evaporation from flat sheets of the dimethylformamide in a forced-air oven at +65° C.

The films, after conditioning to room temperature and humidity, are cut into strips with a length of 50 mm and section of 35 mm and subjected to strain by means of INSTRON, under the following conditions:
distance between the clamps 12.5 mm
strain rate 50 mm/minute
for each of these the maximum stress is indicated together with the corresponding elongation and secant module corresponding to 100% of elongation at 100, 200 and 300% of elongation before and after undergoing aging for the duration of thirty days by immersion in water (hydrolysis test) or exposure to heat (thermal resistance test).

The hydrolysis test was carried out by immersing the TPU film in deionized water at 85° C.; the mechanical resistance test was carried out in air in an oven at a temperature of 120° C.

The results are shown in table 2, examples 12–17.

As control example, the same table indicates the results obtained using in the TPU a commercial polyetherglycol with Mn 2000, whose structure is represented by a polypropyleneglycol telomerized with ethyleneoxide i.e. ethyleneglycol bis (propyleneglycol b ethylene glycol) ether (EP 580 Aldrich) (ex, 18, control 2), and a commercial polyester, a polycaprolactone (CPL) with Mn 2000 of Interox (ex. 19, control 1).

From observing table 2 it is possible to verify the excellent mechanical properties provided by the TPU produced with the PEG CD prepared according to the process of the present invention; in particular compared to the TPU obtained from the comparative polyols, the TPU from PEG CD generally have higher modulus values (100% elongation), the highest values being given by the TPU from PEG CD with a higher content of [$CO_3$] (ex. 1, 3, 6); the higher content of $CO_3$ in the PEG, also guarantees excellent thermal resistance to TPU, much higher than that shown by the TPU of pure polyether (control 1, ex. 18).

The hydrolytic resistance of the TPU from PEG CD is generally excellent, higher than that of the TPU obtained from the above polyether and much higher than that of the TPU obtained from PCL (ex. 19).

TABLE I

| Ex. nr | 2 | 3 | 4 | 5 | 6 | 7 | 8 | 9 | 10 | 11 |
|---|---|---|---|---|---|---|---|---|---|---|
| a) | 30.1 | 43.3 | 43.1 | 25.1 | 30.9 | 33.2 | 21.9 | 12.6 | 25.3 | 14.7 |
| b) | 57.25[a] | 49.63[a] | 55.63[a] | 63.0[a] | 54.7[b] | 58.28[a] | 61.14[b] | 49.17[b] | 50.59[b] | 45.74[b] |
| c) | >98 | >98 | >98 | >98 | >98 | >98 | >98 | >97 | >97 | >97 |
| d) | prim. alcohol | prim. alcohol | prim. alcohol | prim. alcohol | pr.alc. sec.alc | prim. alcohol | pr.alc. sec.alc | second. alcohol | second. alcohol | sec. alc. |
| e) | | | | | | | | | | |
| I | 1960 | 2260 | 2017 | 1780 | 2051 | 1925 | 1835 | 3423 | 3270 | 3500 |
| II | −40 | −21 | −23 | −70 | −31 | −30 | −56 | | | |
| III | 0.0058 | 0.0028 | 0.0012 | 0.0009 | 0.0017 | 0.0026 | 0.0042 | 0.009 | 0,009 | 0.015 |
| f) | | | | | | | | | | |
| 25° C. | 25,000 | 390,000 | 300,000 | 6,000 | 46,000 | n.d. | 11,000 | 48,000 | 101,000 | 28000 |
| 50° | — | n.d. | 17,000 | n.d. | n.d. | — | n.d. | n.d. | n.d. | n.d. |
| 75° | — | — | 2,600 | — | — | — | — | — | — | — |
| 90° | — | — | n.d. | — | — | — | — | — | — | — |
| g) | yellow | light yellow | light yellow | light yellow | yellow | yellow | light yellow | n.d. | n.d. | n.d. |
| h) | 1.95 | 2.02 | 1.87 | n.d. | n.d. | n.d. | 1.78 | 3.30 | 3.48 | 3.10 | a) $-\overset{O}{\overset{\|}{O C O}}-$ (weight %)

b) ([a]) $N°_{OH}$ (mg KOH/g) - Acetylation with acetic anhydride in pyridine - ASTM D 2849. ([b]) Phthalic anhydride in bottles under pressure - ASTM D 2849 c) OH chain-ends (% of theoretical functionality of 2). The OH chain-ends are calculated on the basis of the $^1$H NMR spectra calculating the relative areas of the triplet of $CH_2-OH$ at 3.66 ppm (methylene adjacent to hydroxyl) and of the single signal (Brucker spectrometer, 400 Mhz) due to residual methyl carbonate chain-ends at 3.75 ppm The ratio between primary and secondary alcohols is calculated on the basis of the $C^{13}$ nmr spectra in the case of examples 5 and 7, assigning the $-CH_2-OH$ to 60.8 ppm and $-CH-OH$
|
$CH_3$ to the signals between 64.9 and 66.2 of the chain-ends by means of the DEPT method (the signal $C_{13}$ of $CH_3$
|
$-CH-OH$ is inverted in the spectrum using this method) and including in the calculation areas relating to these signals;

d) chain-end alcohol group e) I: Mn II: tg° C. (DSC) III: unsaturations (meq/g) - Mercury acetate method. ASTM D 2849 f) viscosity (Cps)

g) colour h) gpc (Mw/Mn) -

TABLE 2

| Ex. Nr | 12 | 13 | 14 | 15 | 16 | 17 | 18 | 19 |
|---|---|---|---|---|---|---|---|---|
| a | 1 | 2 | 3 | 5 | 6 | 8 | control | control |
| b | 121 | 8.53 | 11.3 | 7.03 | 8.5 | 7.5 | 7.0 | 4.7 |
| c | 64.1 | 44.2 | 62.0 | 60.0 | 47.6 | 48.4 | 51.3 | 58.2 |
| d | 1520 | 1608 | 1520 | 1350 | 1510 | 1520 | 1690 | 1300 |
| e | n.d. | n.d. | 11.3 | 7.3 | 10.51 | n.d. | 6.43 | 6.2 |
| f | n.d. | n.d. | 59.54 | 61.20 | 56.04 | n.d. | 45.1 | 11.6 |
| g | n.d. | n.d. | 1710 | 1762 | 1450 | n.d. | 1824 | 450 |
| h | n.d. | 7.60 | n.d. | 6.69 | 11.29 | n.d. | 6.13 | 6.0 |
| i | n.d. | 19.32 | n.d. | 18.82 | 42.84 | n.d. | 11.62 | 57.0 |
| l | n.d. | 1230 | n.d. | 904 | 1230 | n.d. | 689 | 1420 |

Tensile properties
(a) PEG CD of example (Nr)
(b) Secant Module 100% elongation, $N/mm^2$
(c) Maximum stress, $N/mm^2$
(d) Maximum elongation %
85° C.
water
30 days
(e) Secant module 100% elongation, $N/mm^2$
(f) Maximum stress, $N/mm^2$
(g) Maximum elongation %
120° C.
air
30 days
(h) Secant module 100% elongation, $N/mm^2$
(i) Maximum stress, $N/mm^2$
(l) Maximum elongation %

I claim:

1. A process for the preparation of polycarbonate copolyether polyols having formula (I):

$$R+(O\overset{O}{\overset{\|}{C}}OR_1)_x-(O\overset{O}{\overset{\|}{C}}OR_2)_y-\ldots(O\overset{O}{\overset{\|}{C}}OR_n)_z-OH]_n \quad (I)$$

wherein R is an organic radical with a valence n varying from 2 to 6, selected from the following structures:

$$-(CH_2-CH_2O)_{x'}-CH_2-CH_2-$$

wherein x' varies from 0 to 4

$$-(CH_2-CH_2-CH_2-CH_2O)_y-CH_2-CH_2-CH_2-CH_2-$$

wherein y' varies from 1 to 10

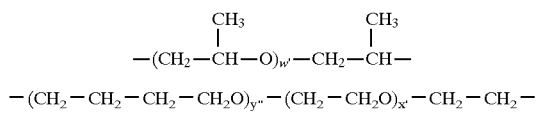

wherein y' varies from 1 to 5

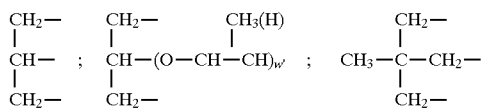

wherein w' varies from 1 to 10

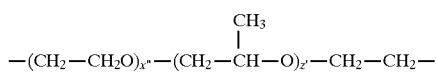

wherein z' varies from 1 to 3 and x" from 1 to 5

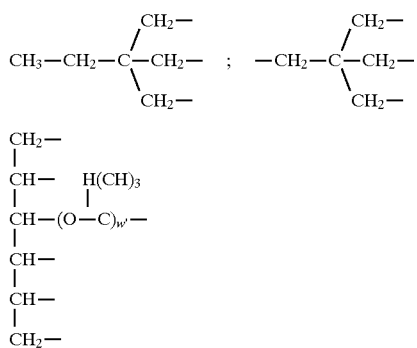

wherein w' varies from 1 to 10

$R_1, R_2 \ldots R_n$ in formula (I), the same or different are divalent organic radicals in the group of those listed for R;

x, y . . . z, represent the number of sequences, statistically distributed, of oligopolyether carbonates deriving from glycols whose organic radical corresponds to $R_1$, $R_2 \ldots R_n$ respectively and said x, y . . . z, either singly or as a sum has a value, also fraction within the range of from 2 to 30;

comprising reacting dimethylcarbonate (DMC) with one or more polyether diols whose organic radicals R, $R_1$, $R_2, \ldots R_n$ have been previously defined and with one or more polyether diols with a molecular weight of between 100 and 200 as measured by the method of ASTM D2849, at a DMC/polyether diols ratio of between 0.5 and 1.35, at a temperature of between 130° and 185 ° C., in the presence of a catalyst comprising an oxide, a carbonate or an alcoholate of a metal of the first or second group or a salt or an organometallic compound belonging to the third or fourth or fifth group with a concentration of between 0.0001 and 0.01% by weight.

2. The process according to claim 1 characterized in that at least one of the divalent organic radicals $R_1, R_2 \ldots R_n$ derives from an oligopolyether diol (PEG) with a molecular weight of between 106 and 200 and participates in structures I in a proportion of not less than 10% by weight of the sum of the organic radicals of polyether glycols with a molecular weight of more than 200 units.

3. The process according to claim 2 charaeterized in that polycarbonate copolyether diols are prepared, having the formula (Ia):

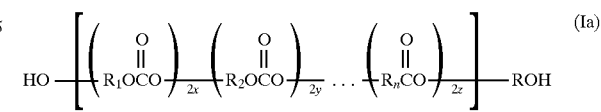

wherein R is a divalent organic radical; $R_1, R_2 \ldots R_n$, have the value indicated above and are present in the structure up to a proportion, individually or as a sum, of not less than 10% by weight with respect to the organic radicals deriving from other glycols;

x, y, . . . z have the value previously indicated.

4. The process according to claim 1 wherein the divalent organic radicals $R_1, R_2 \ldots R_n$ derive from polyethylene glycols selected from the group consisting of diethyleneglycol (DEG), triethyleneglycol (TEG), tetraethyleneglycol (4 EG) and polyethyleneglycols with Mn 200 (PEG 200), dipropyleneglycol (DPG), tripropyleneglycol (TPG), polypropyleneglcyol with Mn 400 (PPG 400), polypropyleneglycol Mn 650 (PPG 650), PTMEG with Mn 250 (PTMEG 250), PTMEG with Mn 600 (PTMEG 600).

5. The process according to claim 1 characterized in that the molecular weight control of the polycarbonate copolyether diols (PEG CD) and triols having formula I within a range of 500 and 5000 is carried out by extracting by means of distillation polyetherglycol with a molecular weight of between 100 and 200, under vacuum <5 mm Hg.

6. The process according to claim 1 characterized in that the pressure, in a total operating cycle varying from 8 to 48 hours, is varied according to the following scheme:

a first phase of a duration of from 6 to 24 hours, at atmospheric pressure;

a second phase of a duration of from 2 to 8 hours, at a pressure of between 150 and 760 mm Hg;

a third phase of a duration of between 2 and 10 hours is carried out under vacuum <5 mm Hg.

7. The process according to claim 1 characterized in that CaO is used as catalyst at concentrations of between 0.0001 and 0.0005% expressed as $Ca^{2+}$ ion.

8. The process according to claim 7 characterized in that the catalyst CaO is used in the form of a saturated aqueous solution.

9. The process according to claim 1 characterized in that titanium tetralkoxide is used as catalyst at concentrations of between 0.0005 and 0.003% as $Ti^{4+}$ ion.

10. The process according to claim 1 characterized in that the reaction is carried out at a temperature of between 160° and 175° C.

11. Polycarbonate polyether diols and triols having formula (I) characterized by a molecular weight of between 500 and 5000 as measured by the method of ASTM D2849, a colouring of less than 200 APHA, a hydroxylic fumctionality greater than 99% with respect to the theoretical value, obtained by the process of claim 1.

12. The process according to claim 3, wherein R is identical to $R_1$ or $R_2$ or $R_n$.

13. A method of increasing rigidity of a composition comprising:

adding the polycarbonate polyether diols and triols of claim 11 to a composition selected from the group consisting of polyurethane end products, thermoelastomers, paints, and adhesives.

14. The process according to claim 1, characterized in that polycarbonate copolymer diols are prepared having the formula (Ia):

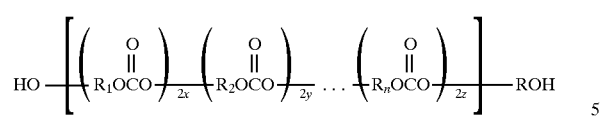
wherein R is a divalent organic radical; $R_1, R_2 \ldots R_n$, have the value indicated above and are present in the structure up to a proportion, individually or as a sum, of not less than 10% by weight with respect to the organic radicals deriving from other glycols;
x, y, ... z have the value previously indicated and R can be indifferently identical to $R_1$ or $R_2$ or $R_n$.
* * * * *